United States Patent [19]

Alexander

[11] 4,008,188
[45] Feb. 15, 1977

[54] ON-SITE GENERATION OF POLYURETHANE FOAM

[75] Inventor: Roy P. Alexander, Killingworth, Conn.

[73] Assignee: Olin Corporation, New Haven, Conn.

[22] Filed: Mar. 24, 1975

[21] Appl. No.: 561,392

[52] U.S. Cl. .................... 260/2.5 AP; 260/2.5 BD; 260/2.5 AT
[51] Int. Cl.² ........................................ C08G 18/14
[58] Field of Search ............... 260/2.5 AP, 2.5 AS, 260/2.5 AT, 210 R

[56] References Cited
UNITED STATES PATENTS

| | | | |
|---|---|---|---|
| 3,072,582 | 1/1963 | Frost | 260/2.5 AP |
| 3,219,598 | 11/1965 | Bressler | 260/2.5 AS |
| 3,269,961 | 8/1966 | Bruson | 260/2.5 AP |
| 3,394,164 | 7/1968 | McClellan et al. | 260/2.5 AT |
| 3,402,169 | 9/1968 | Jackson | 260/210 R |
| 3,419,532 | 12/1968 | Jackson | 260/2.5 AP |
| 3,692,707 | 9/1972 | Pruit et al. | 260/2.5 AT |
| 3,741,921 | 6/1973 | Lapkin | 260/2.5 AS |
| 3,847,844 | 11/1974 | Fuzesi et al. | 260/2.5 AP |
| 3,883,571 | 5/1975 | Allport et al. | 260/2.5 AT |

*Primary Examiner*—H.S. Cockeram
*Attorney, Agent, or Firm*—F. A. Iskander; Thomas P. O'Day

[57] ABSTRACT

A prepolymer of a polymeric isocyanate and a halogenated polyol is used in generating polyurethane foam by means of a portable foaming apparatus. Such prepolymers retain the frothing agent adequately, have improved stability and exhibit practically no crystallization or viscosity increase on storage.

16 Claims, No Drawings

ON-SITE GENERATION OF POLYURETHANE FOAM

This invention relates to an improvement in the preparation of polyurethane foam. More particularly, the invention relates to an improved process for the on-site production of polyurethane foam by means of portable foaming apparatus.

Various portable systems have been developed in recent years for the on-site generation of polyurethane foam as used, for instance, in making foam-core structural panels and poured-in-place foam building insulation. See for example the portable foaming apparatus disclosed in U.S. Pat. Nos. 3,541,023 and No. 3,769,232.

Typically, a portable apparatus for the on-site generation of polyurethane foam comprises two reactants supply tanks, for supplying the polyol reactant, the organic isocyanate reactant, and other ingredients used in making the foam. Such apparatus also includes a static mixer for blending these materials together before they are dispensed onto a surface where foaming takes place. As distinguished from the mechanical mixers used in stationary or non-portable foaming systems, the static mixer by definition has no moving parts. Usually it is made up of a hollow tube or chamber having a plurality of internal elements designed to bring about blending of the foam forming ingredients as these flow through the mixer. An illustrative such mixer is disclosed in U.S. Pat. No. 3,286,992.

It is generally known that thorough mixing and blending of the foam forming ingredients, to the degree necessary for generating a uniform and acceptable foam, cannot ordinarily be achieved by the single expedient of using a static mixer. Accordingly, resort is had to the added expedient of incorporating an auxiliary foaming agent or frothing agent into the foam forming reaction mixture. When dissolved into the contents of the reactants supply tanks, this material serves to augment the function of the static mixer in bringing about the requisite degree of blending the foam forming ingredients.

It is common practice in the on-site generation of foam as summarized above to employ the prepolymer technique as contrasted with the one-shot technique. That is to say the organic isocyanate reactant, such as toluene diisocyanate, is commonly supplied in the form of an isocyanate-terminated prepolymer thereof with a polyol. One of the reasons for this is in order to make more efficient use of the highly reactive toluene diisocyanate. Another consideration is that the prepolymer acts as a better solvent for the frothing agent than the pure isocyanate. Thus frothing agent retention is improved, thereby minimizing losses during foaming and achieving a product having the desired density and uniformity.

It is also known, in the general art of making polyurethane foam, that foams derived from polymeric isocyanates have certain improved properties, e.g., reduced flammability and better aging properties, as compared with foams derived from monomeric polyisocyanates. Accordingly, it is desirable to employ such polymeric isocyanates in certain applications involving the generation of foam through a portable foaming apparatus. However, this objective cannot be achieved to a practically satisfactory degree using prior art methods as described above. This is due to the general insolubility of conventional frothing agents in polymeric isocyanates which raises the problem referred to earlier of inadequate frothing agent retention. Furthermore, this problem has not been resolved in a practically satisfactory manner by resort to conventional prepolymer techniques. The reason for this is the instability of conventional prepolymers which are based on polymeric isocyanates. More specifically, unless used within a relatively short time after they are prepared, such prepolymers exhibit noticeable crystallization. The effect of such crystallization, which frequently manifests itself during normal processing and handling of the prepolymer, e.g., during transport or temporary storage, is to plug up the flow of the reactants through the foaming equipment.

Now an improvement has been found which enables full utilization of polymeric isocyanates in the on-site generation of polyurethane foam by means of portable foaming systems. This objective is achieved, according to the invention, by utilizing the polymeric isocyanates in the form of isocyanate-terminated prepolymers thereof with a halogenated polyol. Surprisingly, these prepolymers, along with exhibiting adequate retention for the frothing agent, have been found to have improved stability and exhibit practically no crystallization or viscosity increase on storage or during transport. The on-site generation of rigid polyurethane foam using such prepolymers yields cellular products which are highly useful in a variety of building and other insulating applications.

Except for the use of the polymeric isocyanate-halogenated polyol prepolymer, the on-site generation of polyurethane foam is achieved using any suitable prior art foaming formulation and apparatus. The former usually includes any combination of polyol reactants, foaming agents, catalysts and other materials used in foam making. The foaming apparatus is of the portable type which embodies a static mixer. It is thus to be understood that the term "portable foaming apparatus," as used in the specification and claims herein, refers to any suitable such apparatus which includes a static, as opposed to a mechanical or motorized, mixer. The portable foaming apparatus usually also includes two reactants supply tanks, namely, a first tank for supplying the main polyol reactant and a second tank for supplying the isocyanate reactant which, in the case of the invention, is an isocyanate-terminated prepolymer. The static mixer has inlets communicating with the reactant supply tanks and an outlet for expelling the mixed reactants. Further, the portable foaming apparatus comprises means for imposing gas pressure to motivate the reactants from their respective tanks through the mixer. For example, a nitrogen cylinder may be used having valved outlets communicating, via suitable conduits, with the inlets to the reactants supply tanks. For further illustration of the general type of portable foaming apparatus that may be used in practicing the process of the invention, see U.S. Pat. No. 3,769,232 and No. 3,5431,023, the entire disclosures of which are incorporated herein by reference.

More in detail concerning the foam forming formulation, this comprises a polyol, hereinafter referred to as the "main polyol reactant," which is reacted with the polymeric isocyanate-halogenated polyol prepolymer in making the foam. Supplied from the first reactants supply tank, the main polyol reactant can be any suitable compound, or mixture of such compounds, having 2–8 hydroxyl groups. Generally, this includes the polyether polyols and the polyester polyols. However, the polyether polyols are preferred, especially those having a hydroxyl number of about 300-700 which are used to make rigid polyurethane foam. Illustrative such polyether polyols include the oxyalkylated polyols. These can be prepared by methods well known in the art wherein a polyhydroxy initiator, or a mixture of such initiators, is condensed, in the presence of an acidic or basic catalyst, with an alkylene oxide, or a mixture of alkylene oxides using either random or step-wise oxyalkylation techniques. The alkylene oxides are exemplified by ethylene oxide, propylene oxide, butylene oxide and the ephihalohydrins such as 4,4,4-trichloro-1,2-epoxybutane. The preferred alkylene oxides are those having 3-4 carbon atoms such as propylene oxide.

Polyhydroxy initiators suitable for preparing the polyether polyols mentioned illustratively above include for example ethylene glycol, propylene glycol, water, glycerol, trimethylolpropane, pentaerythritol, sorbitol, methyl glucoside, sucrose, dextrose and various mixtures comprising one or more of these initiators. If desired a portion of the polyhydroxy initiator may be replaced with another compound having at least two active hydrogens such as an amine or an alkanolamine.

Particularly preferred polyether polyols for use in practicing the invention are those having an average of 3-8 hydroxy groups and a hydroxyl number ranging from about 325 to about 600.

The polyurethane foam is prepared in the presence of a frothing agent and a foaming agent. Dichlorodifluoromethane is the preferred frothing agent, and this is generally referred to in the industry as "Freon 12." The frothing agent is preferably blended or dissolved into both the main polyol reactant and the prepolymer reactant before they are mixed together via the portable foaming apparatus. The frothing agent may be used in any suitable proportion, such as about 2-10%, and preferably about 3-9%, by weight of all the ingredients used in making the foam. The most preferred level is about 4.5-7.5% by weight.

The foaming agent, which is usually blended or dissolved into the main polyol reactant along with the frothing agent, can be any one of those suitable for this purpose such as water, the organic foaming agents and mixtures thereof. Illustrative organic foaming agents include the low molecular weight alkanes and halogenated alkanes other than dichlorodifluoromethane. Illustrative alkanes include for example methane, ethane, and propane; and illustrative halogenated alkanes include for example trichlorofluoromethane, trichlorotrifluoroethane, dichlorotetrafluoroethane, methylene chloride, chloroform, carbon tetrachloride and the like. The preferred foaming agents are water, the chlorofluoroalkanes and mixtures thereof, trichlorofluoromethane and mixtures thereof with water being most preferred.

The proportion of foaming agent or mixture thereof may be varied over a wide range as is well known in the art. For example the organic foaming agent may be employed in an amount ranging from about 5 to about 60 parts per every 100 parts by weight of the main polyol reactant; and the level of water may range from about 0.1 to about 10 parts per every 100 parts by weight of the main polyol reactant.

The foams of the invention are prepared in the presence of a reaction catalyst. This may be any one of those known to be useful for this purpose, or mixtures thereof, including the tertiary amines and the metallic salts, particularly stannous salts. Typical tertiary amines include, for example, N-methyl morpholine, triethylene diamine and triethylamine. Typical metallic salts include, for example, dibutyltin dilurate, stannous octoate and the like. The preferred catalysts are the tertiary amines such as triethylene diamine which may be purchased, as a ready-to-use composition, under the trademark "Dabco 33-LV." Any suitable catalytic proportion of the catalyst may be employed, such as from about 0.05 to about 5.0, and preferably about 0.075-3.0, parts per every 100 parts by weight of the main polyol reactant. Preferably the catalyst is blended in with the main polyol reactant in the first tank, along with the foaming agent and the frothing agent.

It is preferred in preparing the polyurethane foams of the invention to include in the foam forming reaction mixture a small proportion of a conventional surfactant in order to improve the cell structure of the resulting foam. The surfactant is preferably also blended in with the main polyol reactant in the first reactants supply tank. Typical such surfactants are the silicones and the siloxaneoxyalkylene block copolymers. U.S. Pat. No. 2,834,748 and T. H. Ferrigno, Rigid Plastic Foams (New York:Reinhold Publishing Corp., 1963), pp. 38-42, disclose various surfactants which are useful for this purpose. Generally from about 0.1 to about 5 parts by weight of the surfactant are employed per every 100 parts of the main polyol reactant.

If desired, additional ingredients, e.g., flame retardants, pigments and so forth, may be also added to the main polyol reactant to provide certain properties in the resulting foam.

The isocyanate-terminated prepolymer is provided from the second reactants supply tank. Pursuant to the process of the invention, a prepolymer of a polymeric isocyanate and a halogenated polyol is used.

Any suitable polymeric isocyanate composition may be employed in preparing the prepolymer. This includes mixtures comprising one or more such isocyanates. Illustrative polymeric isocyanates are described in U.S. Pat. No. 2,683,730, issued July 13, 1954 to Seeger et al, the entire disclosure of which is incorporated by reference herein.

Typical polymeric isocyanates are those of formula I as follows:

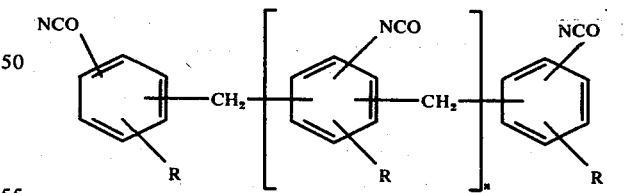

in which R is hydrogen and/or lower alkyl, e.g., methyl, ethyl, propyl and butyl. The preferred polymeric isocyanates as defined by formula I are those in which n is a number ranging in value from 2.1 to 4.0 and R is hydrogen and/or methyl.

Particularly preferred polymeric isocyanates are the polymethylene polyphenylisocyanates (i.e., those represented by formula I wherein R is hydrogen) which are available commercially under the trademark "PAPI." These are usually supplied in the form of a mixture of polyisocyanates having an average NCO functionability of 2.2-3.5, and more commonly about 2.3-3.0. It is to be understood that the terms "polymeric isocyanate" and "polymethylene polyphenylisocyanate," as used in the specification and claims herein, are intended to include mixtures containing one or more such polyisocyanates. Further details concerning the polymeric isocyanates and their preparation are provided in the above-noted Seeger et al patent.

The other reactant which is used in preparing the prepolymer is a halogenated polyol. Pursuant to the invention, the only critical feature of such a polyol is that it contains one or more halogens, e.g., chlorine and/or bromine, substituted on an aliphatic carbon atom. Any such polyol may be used. Thus it is to be understood that, as used in the specification and claims herein, the term "halogenated polyol" is intended to encompass all polyols, including mixtures containing them, which have at least one halogen atom substituted on an aliphatic carbon atom, the halogen being chlorine, bromine or a mixture thereof. These polyols usually have 2–8 hydroxy groups, and they may be of the polyether type or the polyester type. However, polyols of the polyether type are generally preferred.

Included among the polyether polyols used in preparing the prepolymer are the halogenated oxyalkylated polyols. These usually vary in molecular weight over a wide range such as about 100–10,000 and preferably about 150–8,000. As with the main polyol reactant, the halogenated oxyalkylated polyols can be prepared by well known oxyalkylation methods. Thus a polyhydroxy compound, or a mixture of such compounds, is condensed with a halogenated alkylene oxide or a mixture of halogenated and halogen-free alkylene oxides using randon or step-wise addition. U.S. Pat. No. 3,402,169, issued Sept. 17, 1969 to D. R. Jackson provides a detailed description of this method. The entire disclosure of this Jackson patent is incorporated herein by reference.

In preparing the halogenated polyether polyols, any suitable polyhydroxy compound, including mixtures of such compounds and alkylene oxide condensates thereof, may be employed which contains 2–8 hydroxyl groups and is suitable for reaction with an alkylene oxide to form a polyether. Thus a wide range of polyhydroxy compounds is contemplated for use in preparing the halogenated polyol. Illustrative such polyhydroxy compounds include ethylene glycol, propylene glycol, water, glycerol, trimethylolpropane, pentaerythritol, sorbitol, methyl glucoside, sucrose, dextrose, and various mixtures thereof.

A preferred group of polyhydroxy compounds for use in preparing the halogenated polyether polyol is that of the carbohydrate-based materials, particularly dextrose and sucrose-based material. The dextrose may be anhydrous or a hydrated material such as d-glucose monohydrate. Illustrative dextrose-based materials include a mixture of dextrose and water, an oxyalkylated mixture of dextrose and water, a mixture of dextrose and an aliphatic polyhydric alcohol, an oxyalkylated mixture of dextrose and aliphatic polyhydric alcohol, a mixture of dextrose, water, and an aliphatic polyhydric alcohol, or an oxyalkylated mixture of dextrose, water, and an aliphatic polyhydric alcohol; and illustrative sucrose-based materials include a mixture of sucrose and water, an oxyalkylated mixture of sucrose and water, a mixture of sucrose and an aliphatic polyhydric alcohol, an oxyalkylated mixture of sucrose and an aliphatic polyhydric alcohol, a mixture of sucrose, water, and an aliphatic polyhydric alcohol, or an oxyalkylated mixture of sucrose, water, and an aliphatic polyhydric alcohol. Exemplificative aliphatic polyhydric alcohols which may be used in preparing the dextrose and sucrose-based materials include, for example, ethylene glycol, propylene glycol, glycerol, trimethylolpropane, mixtures thereof and the like. A detailed description of the dextrose and sucrose-based materials and their preparation is provided in U.S. Pat. No. 3,741,921, issued June 26, 1973, to Lapkin, the entire disclosure of which is incorporated by reference herein. The dextrose-based materials are especially preferred.

In preparing the halogenated polyether polyol, any alkylene oxide, or mixture thereof, may be used which has one or more halogen substituents, the halogen being chlorine, bromine or a mixture thereof, and which alkylene oxide is capable of reacting with a polyhydroxy compound to form a polyether polyol. If desired, a mixture of a halogen-substituted and a halogen-free alkylene oxides may be used. These alkylene oxides usually contain an epoxide ring and have from 2 to 4 carbon atoms. Preferred among them are alkylene oxides which have a 1,2-epoxide ring, particularly those having 3–4 carbon atoms. It is also preferred that the halogen-substituted alkylene oxide contain at least 2 halogens. Representatives of these include 3,3-dichloro-1,2-epoxypropane; 3,3-dibromo-1,2-epoxypropane; 3,3,3-trichloro-1,2,-epoxypropane; 4,4,4-trichloro-1,2-epoxybutane; 4,4,4-tribromo-1,2-epoxybutane; 4,4,4,3,3-pentachloro-1,2-epoxybutane, 1,1,1,4,4-pentachloro-2,3-epoxybutane, and mixtures thereof. The most preferred such alkylene oxides are those in which all of the halogens are chlorine, such as 4,4,4-trichloro-1,2-epoxybutane.

Any suitable catalyst may be employed to promote the condensation reaction of the polyhydroxy compound with the halogenated alkylene oxide. Usually an acidic catalyst is used such as boron trifluoride and its etherates.

As is well known in the art, the relative proportion of alkylene oxide, or mixture of alkylene oxides, which is used depends on the hydroxyl number which is desired in the polyether polyol product. In accordance with the preferred embodiments of the invention, a sufficient proportion of alkylene oxide is employed to yield a halogenated polyether polyol having a hydroxyl number of about 50–800, more preferably about 80–700, and still more preferably about 250–650. It is also preferred that the halogen content in the polyether polyol be no less than about 8%, and more preferably about 12–60%, by weight.

The preparation of the prepolymer is usually achieved following conventional methods by mixing together the halogenated polyol and the polymeric isocyanate preferably with moderate heating. Such relative proportions of these materials are used as to provide a ratio of NCO to OH groups in the prepolymer ranging from about 3:1 to about 100:1, preferably about 20:1–90:1, and more preferably about 35:1–70:1.

As in the case of the main polyol reactant, the frothing agent is also dissolved into the prepolymer. Thus, both the polyol supply tank and the prepolymer supply tank are provided with the frothing agent, in the level of concentration indicated above, before foaming is commenced. Thereafter the foaming operation can be initiated, stopped and resumed at will using the portable foaming apparatus and ingredients described hereinabove. The material which is dispensed from the static mixer will be a thorough blend of the various ingredients, which blend will have the consistency of a cream or froth. Ordinarily, within about 3 minutes, the froth will rise into a wholesome foam which cures into a rigid substantially uniform cellular body.

The improved process of the invention can be utilized in a variety of applications which require the on-site dispensation of polyurethane foam from a portable foaming system. It is of particular utility in those insulating applications wherein certain physical properties, as derived from the use of a polymeric isocyanate, are desired.

The following examples are provided to illustrate the invention. The portable foaming apparatus used in these examples was identical to the apparatus disclosed in U.S. Pat. No. 3,769,232 except that it did not include the valved timing assembly embodied in the apparatus of that patent. Thus the apparatus used comprises (a) one reactants supply tank for supplying the prepolymer and part of the frothing agent, (b) another reactants supply tank for supplying all the other foam forming ingredients including additional frothing agent, (c) a nitrogen pressure cylinder having a valved outlet communicating, via a distributing valve, with the inlets to the supply tanks, (d) a static mixer having one outlet and two inlets communicating with the supply tanks outlets, and (e) adjustable flow control units interposed in the conduits linking the supply tanks with the static mixer.

Unless otherwise specified, all parts and percentages given in the examples are by weight.

EXAMPLE 1

The portable foaming apparatus described above was employed in preparing a frothed rigid polyurethane foam using the ingredients described below.

A prepolymer was prepared by blending together, with heating to 70° C, 1,000 parts of polymethylene polyphenylisocyanate and 22 parts of a polychlorinated polyether polyol. The former, having a functionability of 2.6, is a commercial product of the Upjohn Company purchased under the trademark "PAPI-135." The polychlorinated polyether polyol had a hydroxyl number of 360 and was prepared as follows. One mole of hydrous dextrose (i.e., d-glucose monohydrate) was mixed with one mole of ethylene glycol. This mixture was heated to about 95° C followed by the addition thereto of 3 grams of boron trifluoride etherate catalyst. Then, over a period of 4½ hours, during which the mixture was maintained at a temperature of about 90° C and under constant agitation, 940 grams of 4,4,4-trichloro-1,2-epoxybutane were added gradually. After an additional post reaction time of 30 minutes, the resulting polyether product was neutralized with an aqueous solution of sodium hydroxide and thereafter stripped of water and low-boiling impurities.

The above-prepared prepolymer was charged to the isocyanate reactant supply tank. Then 61 parts of Freon 12 (dichlorodifluoromethane) were added under pressure and dissolved in the prepolymer.

Into the polyol reactant supply tank, there were charged the following ingredients in the indicated proportions:

| Ingredients | Parts |
|---|---|
| Polyether polyol A[1] | 510 |
| Polyether polyol B[2] | 186 |

-continued

| Ingredients | Parts |
|---|---|
| Polyether polyol C[3] | 77 |
| Triethylene diamine catalyst composition[4] | 5 |
| Surfactant[5] | 10 |
| Trichlorofluoromethane foaming agent | 234 |
| Freon 12 | 61 |

[1]Polyol A had a hydroxyl number of 530 and was prepared by the KOH catalyzed oxypropylation of a mixture of one mole sucrose and two moles diethanolamine.
[2]Polyol B is the same polychlorinated polyether described and used above in connection with the preparation of the prepolymer.
[3]Polyol C is a 1,000 molecular weight polyether prepared by the KOH catalyzed oxypropylation of glycerin.
[4]This catalyst composition is a commercially purchased product sold under the trademark "Dabco 33LV" and consisting mainly of ⅓ by weight triethylene diamine and ⅔ dipropylene glycol.
[5]This surfactant is a polydimethylsiloxane purchased commercially under the trademark "Dow Corning 93".

1. Polyol A had a hydroxyl number of 530 and was prepared by the KOH catalyzed oxypropylation of a mixture of one mole sucrose and two moles diethanolamine. 2. Polyol B is the same polychlorinated polyether described and used above in connection with the preparation of the prepolymer. 3. Polyol C is a 1,000 molecular weight polyether prepared by the KOH catalyzed oxypropylation of glycerin. 4. This catalyst composition is a commercially purchased product sold under the trademark "Dabco 33LV" and consisting mainly of ⅓ by weight triethylene diamine and ⅔ dipropylene glycol. 5. This surfactant is a polydimethylsiloxane purchased commercially under the trademark "Dow Corning 93."

The flow control units in the above-described apparatus were set to permit the flow of materials, from the isocyanate and polyol reactants supply tanks, to the static mixer in a 1:1 ratio by volume. Foaming was then carried out using the apparatus and the above-described ingredients as supplied from their respective supply tanks. The material coming out of the static mixer was a partially pre-expanded mixture or froth which had a thick cream consistency. It was deposited into an open-top, square cardboard box and allowed to rise and cure. Thereafter, the foam was examined for any voids or physical defects. There were none. Rather the foam was uniform throughout and free of any striations, weak spots or voids.

Comparison 1

The identical procedure of Example 1 was followed with two modifications. One is that the polymethylene polyphenylisocyanate was used as is and without blending with a polyol to make a prepolymer. Also the level of polyol B in the polyol reactant supply tank was increased in order to achieve the same over-all ratio of NCO:OH groups as obtained in Example 1.

On foaming, practically no frothing or pre-expansion was observed. Rather, the mixture flowing out of the static mixer had a flat liquid, as opposed to a creamy, consistency. Further, and more importantly, the foam which resulted therefrom had a number of striations and weak spots indicating inadequate mixing of the foam forming ingredients.

This Comparison demonstrates the problem or disadvantage connected with using polymethylene polyphenylisocyanate as is rather than in the form of a prepolymer thereof as used in Example 1.

EXAMPLE 2

The procedure of Example 1 was followed with one modification. This is that foaming was delayed for a few days after the reactants supply tanks were charged. The effect of doing this is to simulate actual commercial operating conditions wherein the supply tanks are placed in temporary storage before or after transport to the locality where they are eventually used for the on-site generation of foams. The delay had no noticeable adverse effect when the contents of the supply tanks were used in foaming. The results of the foaming operation were practically a duplicate of those obtained in Example 1.

Comparison 2

In this comparison, the procedure of Example 2 was followed except that in preparing the prepolymer a halogen-free polyol was used in lieu of the polychlorinated polyol. In this instance the halogen-free polyol was a 360 hydroxyl number polyether prepared by the KOH catalyzed oxypropylation of an equi-molar mixture of dextrose and ethylene glycol.

Shortly after the foaming operation was begun, crystals which had formed in the prepolymer plugged the flow from the isocyanate supply tank. Then the foaming operation had to be halted.

This comparison demonstrates the serious problem which is encountered in using a halogen-free polyol to make a polymethylene polyphenylisocyanate-based prepolymer for utilization in the generation of foam by means of a portable foaming apparatus.

EXAMPLE 3

The identical procedure of Example 2 was followed except that foaming was delayed for a period of three months after the reactants supply tanks were charged. The delay had no noticeable adverse effect when the contents of the supply tanks were used in foaming. Thus the results of the foaming operation were again practically a duplicate of those obtained in Example 1.

What is claimed is:

1. In a process for the on-site generation of rigid polyurethane foam, by means of a portable foaming apparatus, wherein a polyether polyol reactant is mixed and reacted with an isocyanate-terminated prepolymer in the presence of a frothing agent, a foaming agent and a reaction catalyst, the improvement of employing as a reactant a prepolymer of (a) a polymethylene polyphenylisocyanate having an average NCO functionability of 2.2–3.5 and (b) a halogenated polyether polyol which is comprised of the product of reacting a polyhydroxy compound with an alkylene oxide having at least one halogen substituent selected from chlorine, bromine or a mixture thereof, said prepolymer having a ratio of NCO:OH groups ranging from about 20:1 to 90:1.

2. The process of claim 1 wherein said frothing agent is dichlorodifluoromethane.

3. The process of claim 2 wherein said frothing agent is dissolved in said polyether polyol reactant and said prepolymer before these are mixed and reacted together.

4. The process of claim 3 wherein said alkylene oxide contains from 2 to 4 carbon atoms and at least 2 halogen substituents.

5. The process of claim 4 wherein said polymethylene polyphenylisocyanate has a functionability of 2.3–3.0.

6. The process of claim 5 wherein said alkylene oxide contains 3–4 carbon atoms and said halogen is chlorine.

7. The process of claim 6 wherein said alkylene oxide is 4,4,4-trichloro-1,2-epoxybutane.

8. The process of claim 7 wherein said polyhydroxy compound is a dextrose-based material selected from the group consisting of a mixture of dextrose and water, an oxyalkylated mixture of dextrose and water, a mixture of dextrose and an aliphatic polyhydric alcohol, an oxyalkylated mixture of dextrose and an aliphatic polyhydric alcohol, a mixture of dextrose, water and an aliphatic polyhydric alcohol, and an oxyalkylated mixture of dextrose, water and an aliphatic polyhydric alcohol.

9. The process of claim 8 wherein said polyether polyol reactant has an average of 3–8 hydroxy groups and a hydroxyl number of about 325–600.

10. The process of claim 9 wherein said foaming agent and said catalyst are blended with said polyether polyol reactant before the latter is mixed and reacted with said prepolymer.

11. The process of claim 10 wherein said foaming agent is trichlorofluoromethane or a mixture thereof with water.

12. The process of claim 11 wherein said catalyst is a tertiary amine.

13. The process of claim 12 wherein the preparation of the foam is carried out in the presence of a surfactant which is blended in with the polyether polyol reactant.

14. The process of claim 13 wherein said halogenated polyether polyol contains about 12–60% by weight of chlorine.

15. The process of claim 14 wherein said polyhydroxy compound is a mixture of dextrose and ethylene glycol, and said halogenated polyether polyol has a hydroxyl number of about 360.

16. The process of claim 15 wherein said foaming agent is trichlorofluoromethane and said catalyst is triethylene diamine.

* * * * *